United States Patent [19]

Hartinger et al.

[11] 4,350,620

[45] Sep. 21, 1982

[54] PROCESS FOR FILTERING AND ENCAPSULATING RADIOACTIVE PARTICLES

[75] Inventors: Edmund Hartinger, Baden; Elias Jülke, Wettingen; Harald Sandmann, Nussbaumen, all of Switzerland

[73] Assignee: Maschinenfabrik Meyer AG, Deitingen, Switzerland

[21] Appl. No.: 141,353

[22] Filed: Apr. 18, 1980

[30] Foreign Application Priority Data

May 14, 1979 [CH] Switzerland .......................... 4448/79

[51] Int. Cl.$^3$ ................................................ G21F 9/16
[52] U.S. Cl. ...................................... 252/628; 210/777; 210/778; 252/631; 252/632
[58] Field of Search ............... 252/301.1 W, 628, 629, 252/631, 632; 210/777, 778

[56] References Cited

U.S. PATENT DOCUMENTS 4,221,680  9/1980  Hardwick et al. .......... 252/301.1 W

FOREIGN PATENT DOCUMENTS 2135328  2/1973  Fed. Rep. of Germany ... 252/301.1 W
51-2244  1/1976  Japan ................................. 210/778

Primary Examiner—Deborah L. Kyle
Attorney, Agent, or Firm—Oblon, Fisher, Spivak, McClelland & Maier

[57] ABSTRACT

Radioactive particles are removed from waste or process water and encapsulated by a filtration process wherein the water is filtered through a filter medium composed of a thermoplastic organic polymer. The filter cake so obtained is dried and converted to a solid encapsulating medium by the application of heat and/or pressure. The filter medium comprises, at least partially, a thermoplastic polymer which is wettable by water but non-swelling in water and has a melting point of 100° to 300° C.

25 Claims, No Drawings

PROCESS FOR FILTERING AND ENCAPSULATING RADIOACTIVE PARTICLES

BACKGROUND OF THE INVENTION

1. Field of the Invention

This invention relates to a process for separation of radioactive particles from aqueous suspensions and subsequent encapsulation of the particles. More particularly, it relates to the separation of radioactive particles from aqueous suspensions by filtration and subsequent encapsulation of the separated particles in a matrix comprised of a thermoplastic synthetic organic polymer.

2. Description of the Prior Art

In the filtration of industrial waste water and process water, it is customary to use a precoated filter prepared by initially depositing a filter aid on the surface of a relatively large-pore filter medium, e.g., a filter cloth, filter plate, filter cartridge or the like. The filter aids used in such processes can be organic materials, e.g., cellulose, or inorganic materials, e.g., asbestos, bentonite, and the like. Such filter aids are commercially available, for example, under the trademarks LEVASORB, AF 2, and SOLCA-FLOC, among others. After the filter aid has been used in the filtration of the water, it is generally burned or discarded together with the filtered solids. This filtering process using precoated filters and filter aids is satisfactory for the treatment of ordinary water and waste water containing suspended solids since it is effective and economical.

However, the known methods of filtration using precoated filters and/or filter aids are disadvantageous for treating water containing radioactive solids, because if the filter cake (filter aid and filtered solids) is burned a radioactive dust is produced, and, if it is not burned, it must be compressed, dried, and impregnated with bitumen before it is suitable for disposal by storage in steel drums and/or concrete containers.

In the operation of a medium-sized nuclear power plant having a capacity of 600 MW, about 40–50 kg of filter aid would be required for filtration of the radioactive process water (rad waste). Therefore, a relatively large volume of filter cake would be produced. Furthermore, it must be kept in mind that the usual filter aids in the form of cellulose fibers swell in water, with consequent difficulty in drying them, and that impregnation of the resulting dry and voluminous mass with bitumen presents problems.

Hence, a need has continued to exist for a method of easily removing radioactive particles from aqueous suspensions and encapsulating them in a thermoplastic matrix.

SUMMARY OF THE INVENTION

Accordingly, it is an object of this invention to provide an improved method of removing radioactive particles from aqueous suspensions.

A further object is to provide a simplified process for removing radioactive particles from aqueous suspensions and encapsulating them for storage.

Further objects of the invention will be apparent from the description of the invention which follows.

The objects of the invention are achieved in a surprisingly effective manner by filtering the radioactive solids from the aqueous suspension using a filter medium which is predominantly, and preferably essentially entirely, comprised of a thermoplastic polymer which is wettable by water, but essentially insoluble in water (less than 0.1 g/liter at 20° C.) and essentially non-swelling in water (preferably less than about 5 percent by weight water absorption), said polymer having a melting point greater than 100° C. Preferably the melting point of the thermoplastic polymer is between 100° C. and 300° C., and more preferably between 120° and 200° C. The filter medium is preferably comprised of fibrids made from thermoplastic polymers, in particular from polyolefins such as polyethylene, polypropylene, polybutylene and the like.

DESCRIPTION OF THE PREFERRED EMBODIMENTS

The process of the invention is conveniently carried out by precoating a filter medium with a filter aid comprising thermoplastic fibrids to form a filter layer. The aqueous suspension of solids is then passed through this filter layer. More thermoplastic fibrids can be added to the suspension before it is passed through the filter layer to serve as a filter aid. The filter aid is thus incorporated into the filter cake along with the filtered solids.

In another embodiment, porous thermoplastic filtering media can be used as the filter layers.

The filter cake produced by the process of this invention can be dehydrated in a relatively simple manner, for example, mechanically, by expression or centrifuging or, if necessary, by heating to temperatures below the initiation of melting of the thermoplastic polymer. The dried filter cake is then compacted by heating it to a temperature above the melting point of the thermoplatic polymer with at least a partial melting of the polymer. If necessary, this process can be carried out under pressure, for example, in the usual processing machines for thermoplastic such as screw extruders or injection molding machines. In this way, the voluminous filter cake can be converted by an economical process into solid bodies, for example, spheres, which can be embedded without special difficulty in the embedding materials usually used for long term storage of radioactive materials, for example, in concrete. Alternatively, large solid masses can be prepared from the dehydrated filter cake by direct or stepwise melting of the thermoplastic polymer.

Suitable and preferred thermoplastic polymers for use in the process of this invention are known, and they are, to some extent, commercially available as so-called fibrids which are used for the production of wet and tear resistant synthetic paper. These fibrids are based on polyethylene and/or polypropylene, and can be dispersed in water and processed on conventional papermaking machines to produce paper by reason of a hydrophilizing treatment.

Examples of fibrids which are commercially available for producing paper from synthetic fiber, and which are suitable for use in the process of this invention include those sold under the trademarks PULPEX (Solvay), HOSTAPULP (Farbewerke Hoechst), CARIFIL (Shell) and similar products available from Mitsui (Japan) and Montedison (Italy). General information on fibrids, their properties, production, and use, can be found in the literature, for example, regarding polyethylene fibrids, in Angew. Chemie 1978, 90, 833–839.

Other forms of thermoplastic polymers, for example, fibers, powders, or flakes may also be used in the process of this invention. Likewise, other thermoplastic polymers besides homo- or copolymers of ethylene and propylene may be used. The thermoplastic polymer or the fibrids, fibrid aggregates, flakes, or powder made from the polymer, which are used as filter media or filter aids in the process of this invention, can be further modified by adding fillers of suitable density (for example, BaSO4) in order to produce a specific gravity similar to that of water or greater.

In the process of this invention, the thermoplastic polymers can be used as a filter aid (precoated filter) in the form of powder, fibrids, fibers or flakes. They can, if desired, be treated to make them wettable by water by means of techniques which are known, e.g., by modifying the surface of the materials. Treatments which make hydrophobic polymers hydrophilic are known. Special treatments for making polyolefin fibrids hydrophilic are described in the above-mentioned publication. Suitable methods include treating the surface with an urea/formaldehyde condensation resin or a surfactant, or modifying the structure of the polymer to make it hydrophilic.

Preferred polyolefin fibrids suitable for practicing the process of this invention are those having a mean classified fiber length (CFL) of about 0.5 to 2.5 mm and a specific surface area of about 5 to 10 m$^2$/g. Characteristic thicknesses can not, in general, be stated for fibrids, but they typically range up to about 10 micrometers. These fibrids can be prepared by various known crystallization processes, by evaporation of solutions, by extrusion, by stretching, or by crushing polyolefin fibers in refining equipment used in paper and wood technology.

It is thought that the formation of fibrids is due to crystallization phenomena and, therefore, crystallizable polyolefins are preferred for use in the process of the invention, especially those which exhibit crystallization under the application of shearing forces.

Having generally described the invention, a more complete understanding can be obtained by reference to certain specific examples, which are provided herein for purposes of illustration only and are not intended to be limiting unless otherwise specified.

EXAMPLE

A hydrophilic thermoplastic polymer based on polyethylene (a commercial product manufactured by Solvay, "PE-PULPEX", Grad F 041/GP) was dispersed in excess water to form a pulp. This pulp was added to the filtering cycle of an industrial water purification apparatus, initially operating with clean water, in such amounts that a filter layer of 20 g (dry weight) of polyethylene fibrids per square meter was formed on the carrier surface of the precoat filter. Then waste water having a solids content of up to about 1 percent by weight was passed through the filter layer. Additional fibrid pulp was continuously added in an amount which (calculated on the fibrid portion) corresponded approximately to the proportion of impurities in the waste water. In this way the polyethylene fibrids could bind the soil particles even while they were in suspension before they reached the filter cake.

The filtering apparatus was operated until the permissible upper limit of the pressure drop across the filter was reached and then was shut off. The filter cake (polyethylene fibrids and impurities) which formed on the surface of the filter medium was peeled off the filter medium surface. The filter cake was then freed of water by expression and dried to a moisture content of 5–10 percent by weight by heating at temperatures up to 100° C.

The dried filter cake was formed into spheres having a diameter of about 30 mm using a commercial screw injection molding machine operated at temperatures of 130°–190° C., and the spheres so produced were added to concrete mix and the composition was poured into 200 liter drums for permanent storage. Any moisture remaining in the filter cake is driven off in the injection molding step.

Having now fully described the invention, it will be apparent to one of ordinary skill in the art that many changes and modifications can be made thereto without departing from the spirit or scope of the invention as set forth therein.

What is claimed as new and intended to be covered by Letters Patent of the United States is:

1. A method for removing a particulate solid radioactive matter dispersed in an aqueous process stream from said stream comprising the steps of:
    (1) filtering said process stream containing said dispersed radioactive matter through a filter medium consisting of at least predominantly of a water-wettable but substantially water-insoluble polymer material that is thermally fusible at temperatures in the range of from about 100° C. to about 300° C. whereby there are produced (A) a filtered aqueous stream substantially free of said solid radioactive matter and (b) a filter residue containing said thermally fusible polymer material and said particulate solid radioactive matter; and
    (2) heating said filter residue to a temperature in said range of from about 100° C. to about 300°for at least partially interfusing said thermally fusible polymer material whereby there is produced a compacted mixture of said particulate solid radioactive matter and said at least partially interfused polymer material.

2. The process of claim 1, wherein said thermoplastic polymer is selected from the group consisting of polyethylene, polypropylene, and copolymers of ethylene and propylene.

3. The process of claim 1 or claim 2, wherein said thermoplastic polymer is added to the waste water in the form of a filter aid before said waste water is passed through said filter medium.

4. The process of claim 3, wherein said filter aid is in the form of fibrids, flakes, fibers, or powder.

5. The process of claim 1 or claim 2, wherein said filter medium is formed at least in part, by depositing a layer of fibrids from an aqueous suspension of said fibrids on the carrier surface of a precoat filter.

6. The process of claim 1 or claim 2, wherein said filter medium containing said radioactive particles is at least partially mechanically or thermally dehydrated at a temperature below the melting point of the thermoplastic polymer and is subsequently transformed into essentially solid form by heating to a temperature above the initial melting point of the thermoplastic polymer.

7. The process of claim 6, wherein said thermoplastic polymer containing said radioactive particles is subjected to pressure during the transformation into essentially solid form.

8. The process of claim 6, wherein said thermoplastic polymer containing said radioactive particles, after dehydration, is formed under heat and pressure into uniform solid bodies.

9. The process of claim 8, wherein said heat and pressure is applied by a plastics molding machine.

10. The process of claim 9, wherein said plastics molding machine is an injection molding extrusion screw.

11. The process of claim 8, wherein said uniform solid bodies are spherical in shape.

12. The process of claim 8, wherein said uniform solid bodies are subsequently embedded in a durable matrix.

13. The process of claim 12, wherein said durable matrix is concrete.

14. The process of claim 8, wherein said uniform solid bodies are subsequently melted together to form a compact mass.

15. The method of claim 1, wherein said filter residue is dried at a temperature of below about 100° C. prior to said step (2).

16. The method of claim 1, wherein said step (2) includes compression of said filter residue at a temperature in said range for substantially complete interfusion of said polymer material and forming a polymer matrix encapsulating said solid radioactive matter.

17. A method of removing a particulate solid radioactive matter dispersed in an aqueous medium from said aqueous medium and compacting said removed radioactive matter with a thermally fusible material comprising the steps of:
 (1) filtering said aqueous medium containg said dispersed radioactive matter through a filter medium comprised of hydrophilic fibrids of a thermoplastic material that is fusible at temperatures in the range of from about 100° C. to about 300° C., said fibrids having a CFL of from about 0.5 to about 2.5 mm and a specific surface in the range of from about 5 to about $10m^2/g$, so as to form (A) a filter cake containing said fibrids and said solid radioactive matter and (B) a filtrate consisting of said aqueous medium substantially free of said solid radioactive matter;
 (2) removing residual aqueous medium from said filter cake at temperatures below 100° C.; and
 (3) heating said filter cake to a temperature in said range of from about 100° C. to about 300° C. for at least partially interfusing said fibrids in mixture with said solid radioactive matter for compaction thereof.

18. The method of claim 17, wherein step (3) includes compression of said filter cake at said temperature capable of interfusing said fibrids in mixture with said radioactive matter whereby said radioactive matter is encapsulated.

19. The process of claim 17, wherein said thermoplastic polymer containing said radioactive particles, after dehydration, is formed under heat and pressure into uniform solid bodies.

20. The process of claim 19, wherein said heat and pressure is applied by a plastics molding machine.

21. The process of claim 20, wherein said plastics molding machine is an injection molding extrusion screw.

22. The process of claim 19, wherein said uniform solid bodies are spherical in shape.

23. The process of claim 19, wherein said uniform solid bodies are subsequently embedded in a durable matrix.

24. The process of claim 23, wherein said durable matrix is concrete.

25. The process of claim 19, wherein said uniform solid bodies are subsequently melted together to form a compact mass.

* * * * *